United States Patent [19]

Wolf

[11] 4,212,459

[45] Jul. 15, 1980

[54] RACING GAME

[76] Inventor: Tobin Wolf, 285 Aycrigg Ave., Passaic, N.J. 07055

[21] Appl. No.: 877,485

[22] Filed: Feb. 13, 1978

[51] Int. Cl.² .............................................. A63F 9/14
[52] U.S. Cl. .................................................. 273/1 E
[58] Field of Search .................... 273/1 R, 1 E, 1 M; 35/11 R; 46/240

[56] References Cited

U.S. PATENT DOCUMENTS

| 3,012,780 | 12/1961 | Freidman | 273/1 E |
| 3,171,215 | 3/1965 | Glass et al. | 273/1 E X |
| 3,722,884 | 3/1973 | Brown | 273/1 E |
| 3,819,178 | 6/1974 | Ochi | 273/1 E |
| 3,823,941 | 7/1974 | Ochi et al. | 273/1 M X |
| 3,831,172 | 8/1974 | Olliges et al. | 273/1 E X |

FOREIGN PATENT DOCUMENTS

| 1063505 | 8/1959 | Fed. Rep. of Germany | 46/240 |
| 446214 | 4/1936 | United Kingdom | 273/1 E |

*Primary Examiner*—Paul E. Shapiro
*Attorney, Agent, or Firm*—Jay M. Cantor

[57] ABSTRACT

A racing game having movable terrain and a controlled vehicle having freedom in the vertical and horizontal planes. The terrain speeds are controllable by the operator and automatically reduced in response to predetermined improper operation. Obstacles are positioned on the terrain, in the form of a belt, which are self righting according to one embodiment, and require operator righting in accordance with another embodiment. Other obstacles, such as ramps, trees, etc. are permanently positioned. Motor speed is controlled by a potentiometer which is controlled by rotation of a hand grip on the handlebar which rotates a shaft in one embodiment. The belt is driven by a pair of rollers, one being biased to remove belt slack, the rollers having sets of aligned valleys or indentations for accommodating objects secured to the underside of the belt.

The vehicles are rotatable relative to the steering mechanism and touch the belt in a manner to permit them to face along the line which is the vector sum of the speed and direction of belt travel as well as speed and direction of horizontal movement of the vehicle.

Provision is made to provide sounds which simulate the actual vehicle sounds during a race.

23 Claims, 19 Drawing Figures

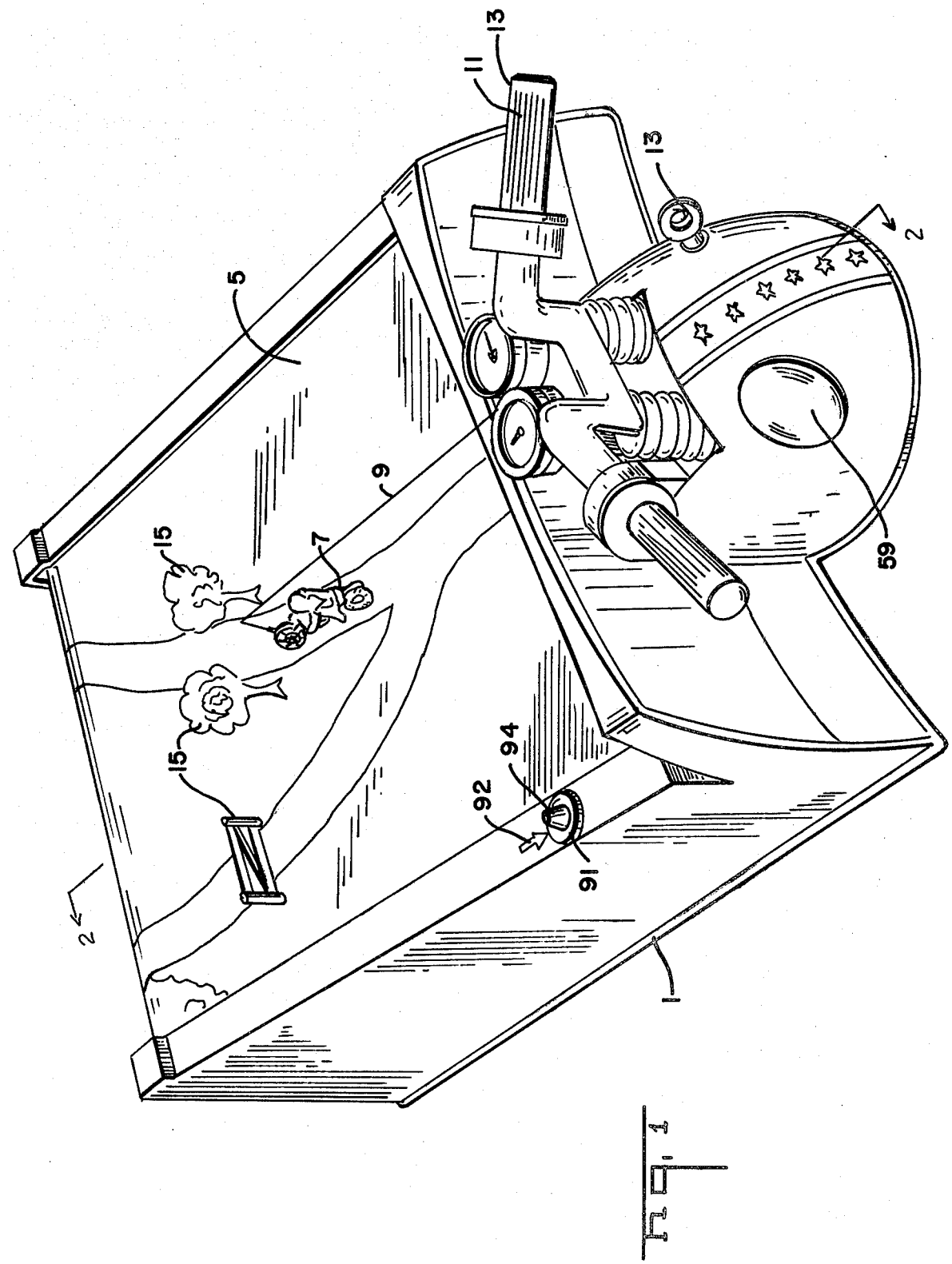

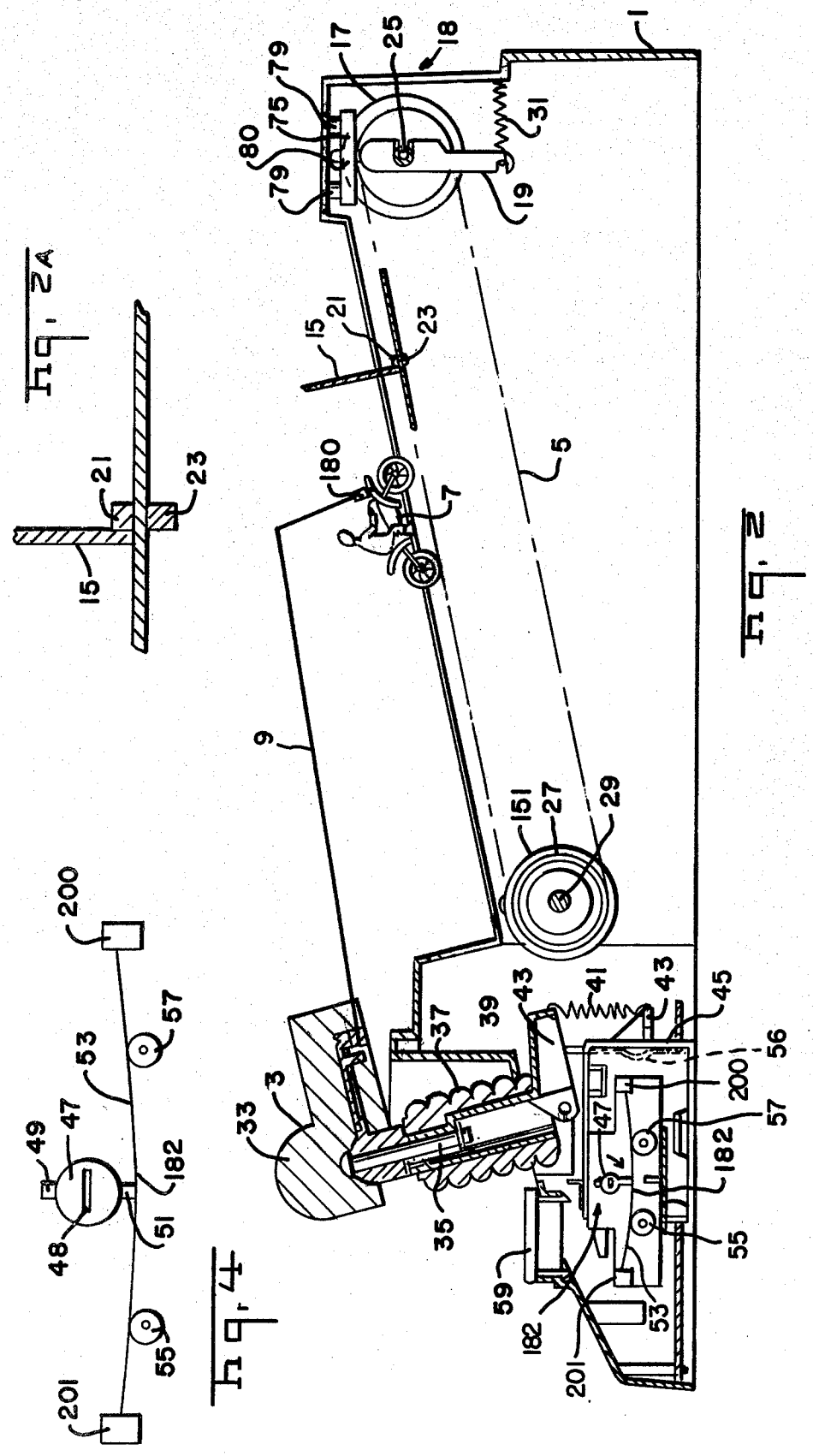

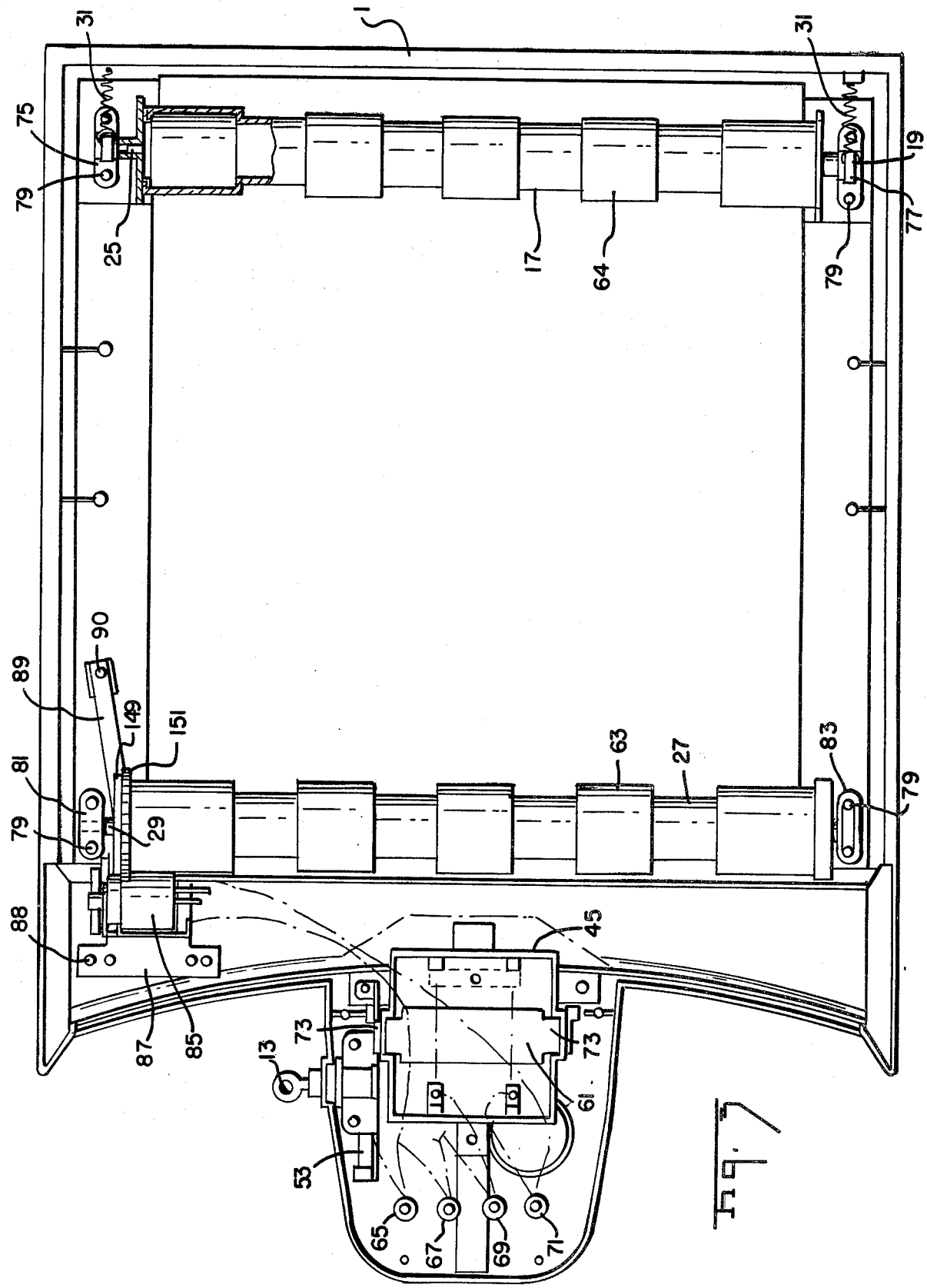

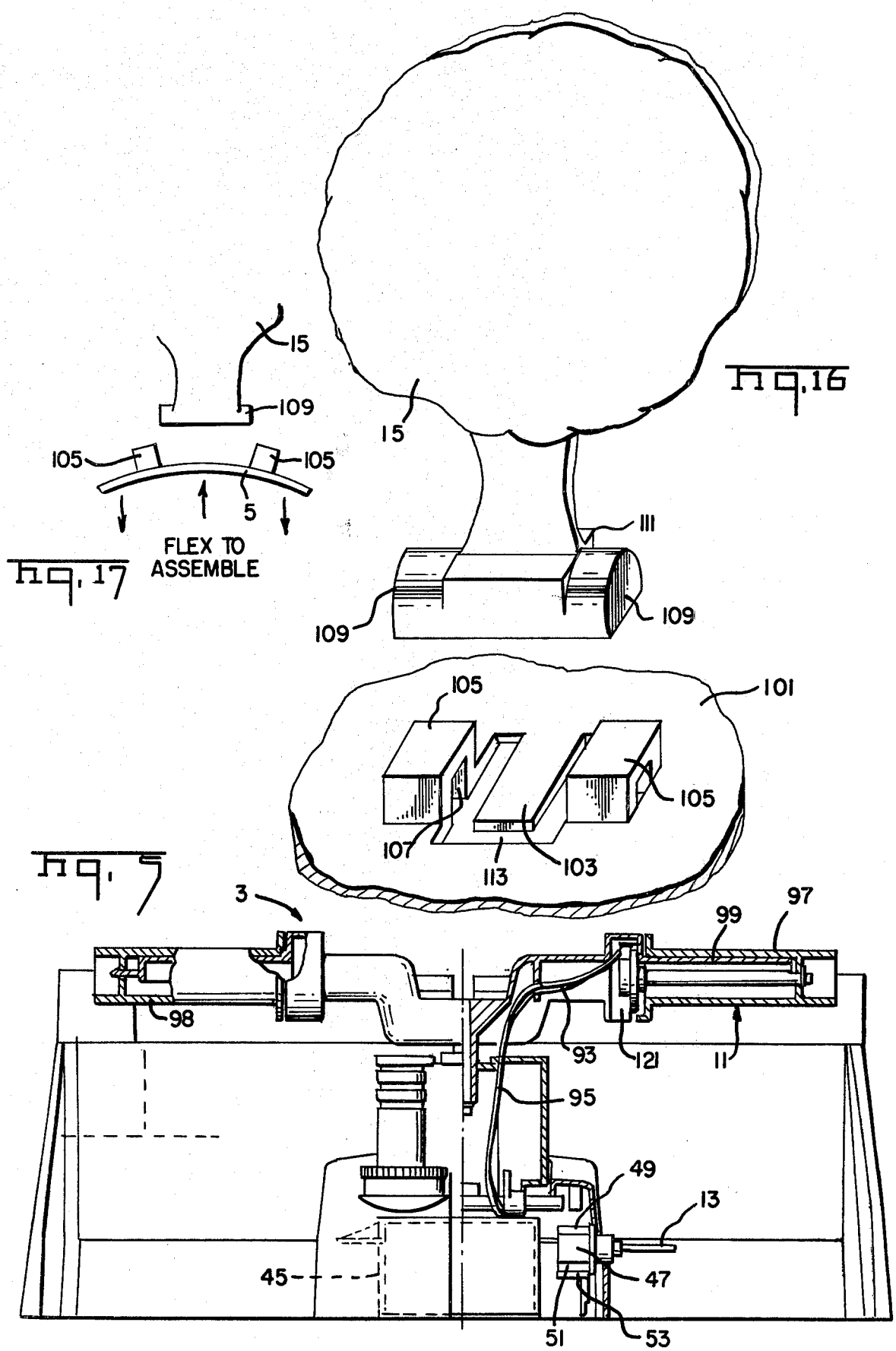

WIRING DIAGRAM

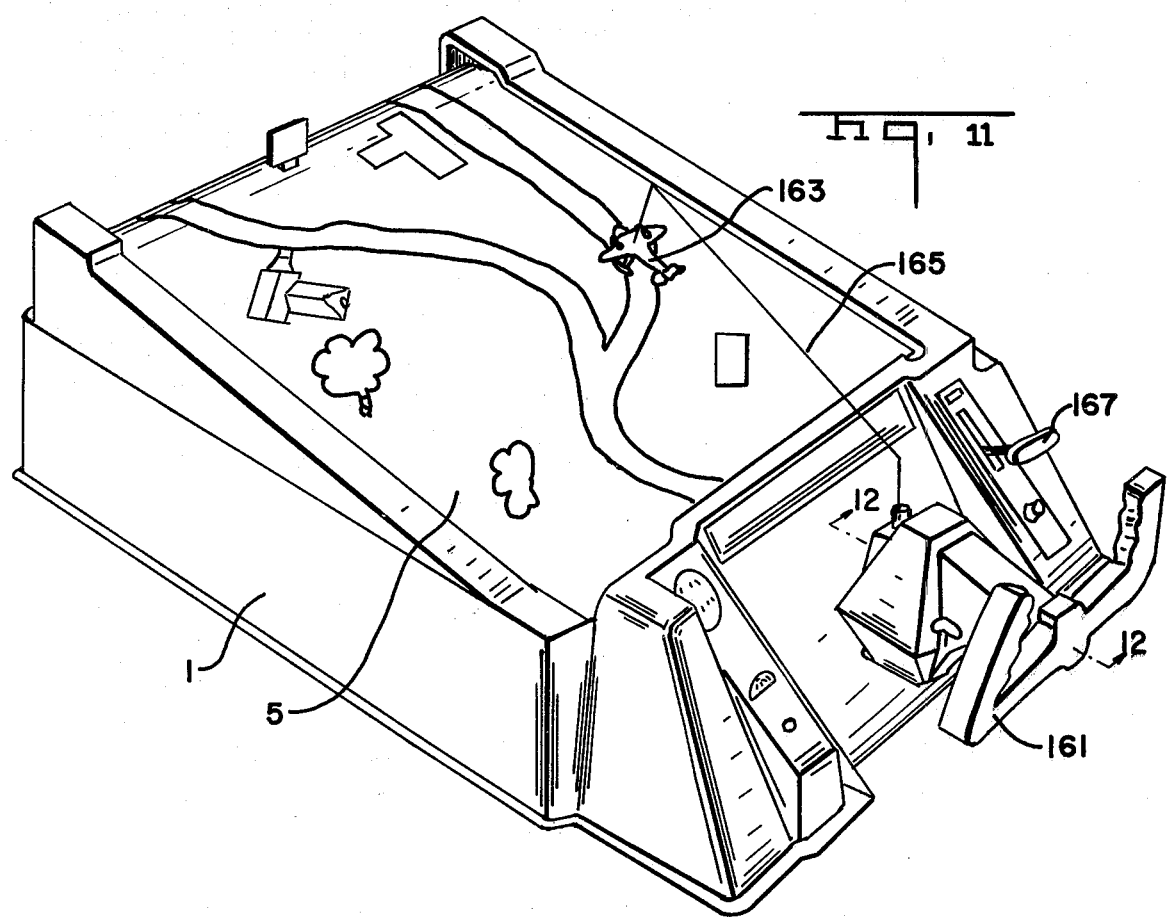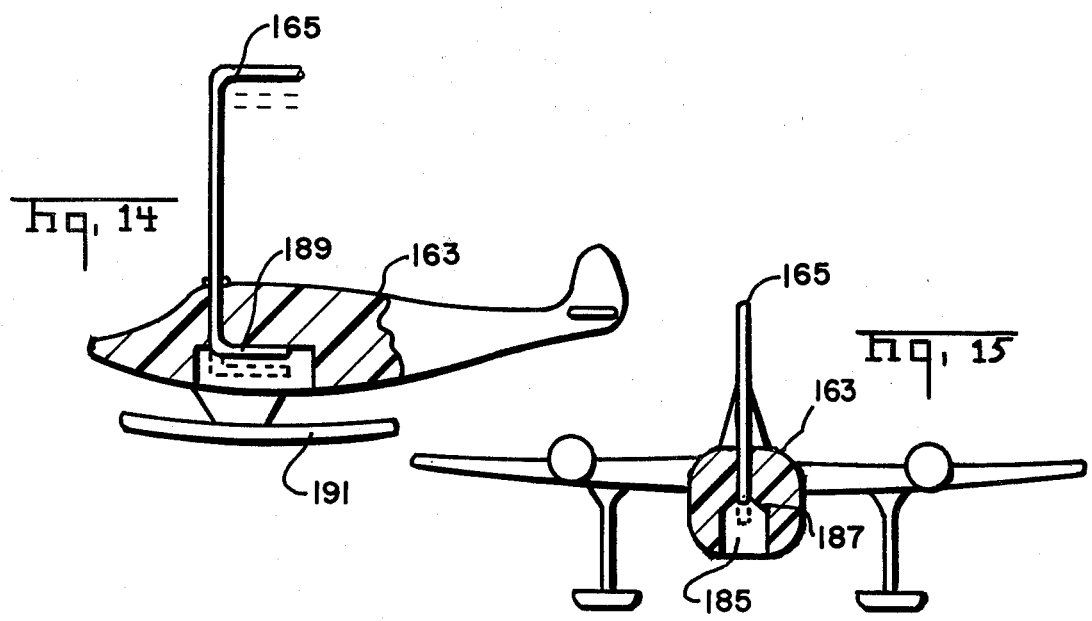

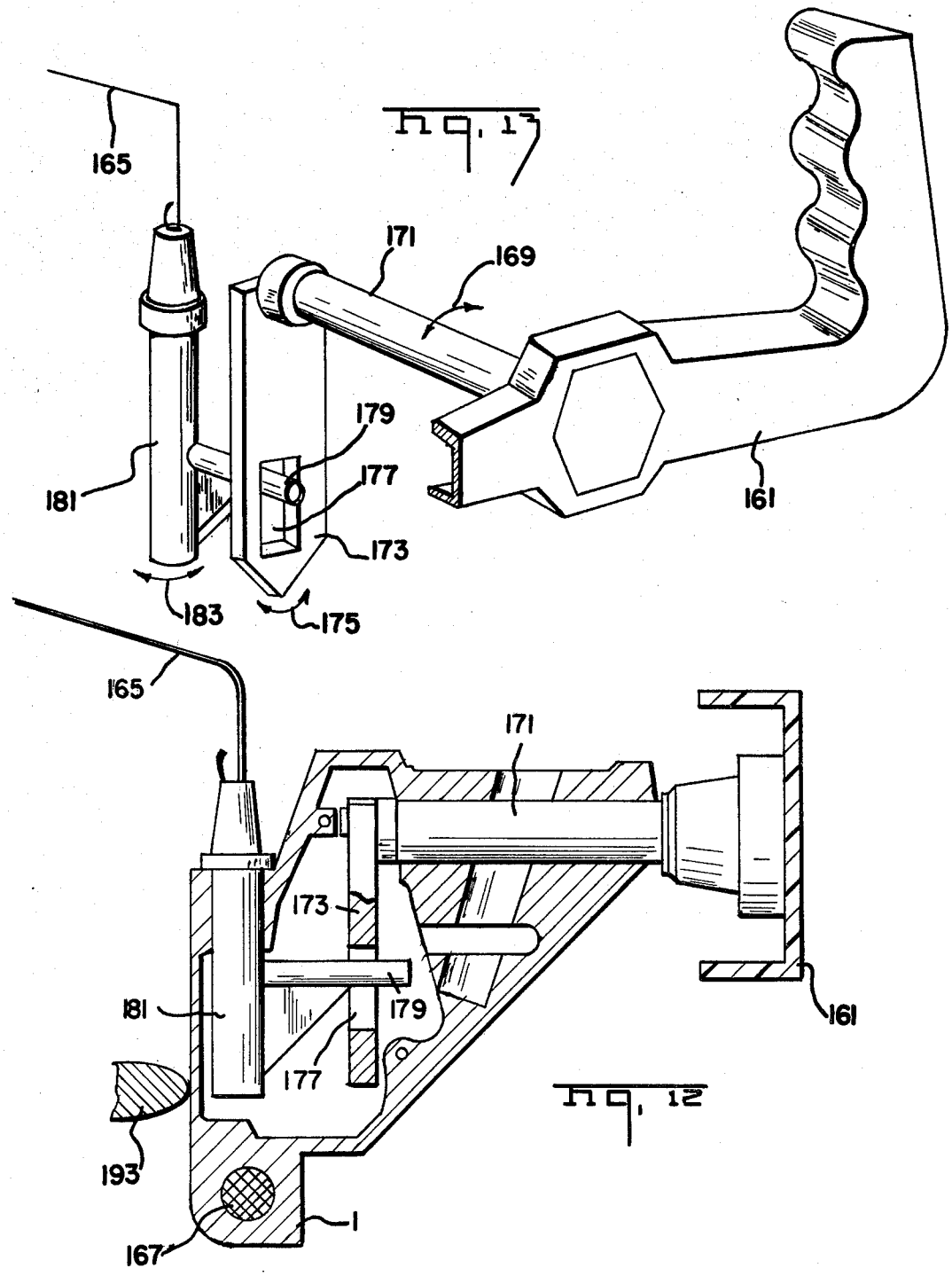

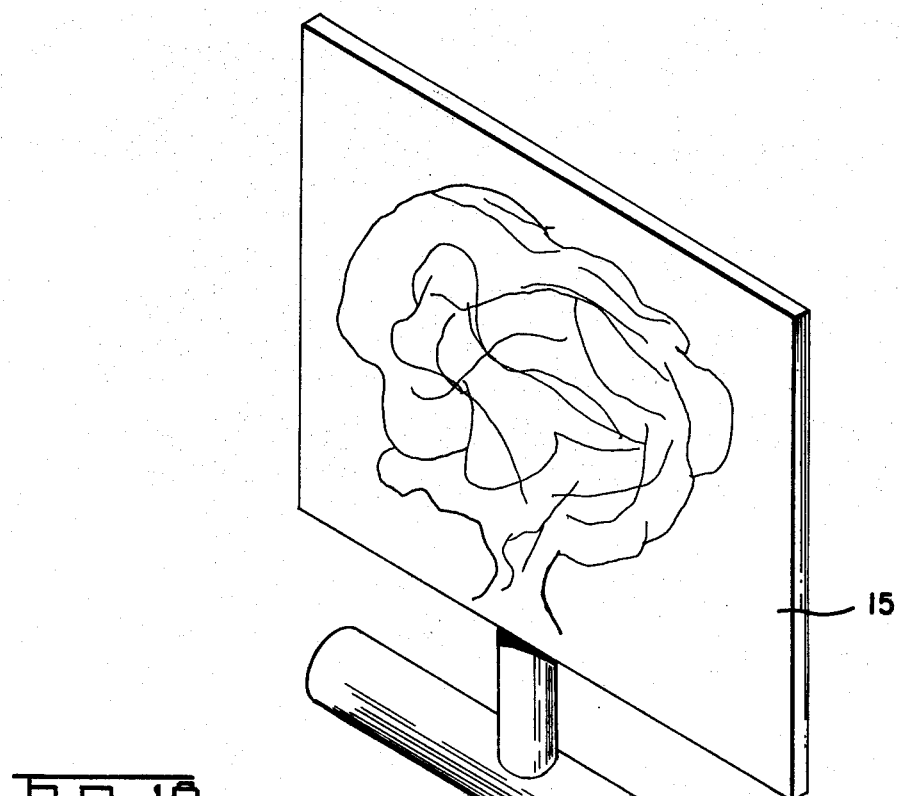
Fig. 18
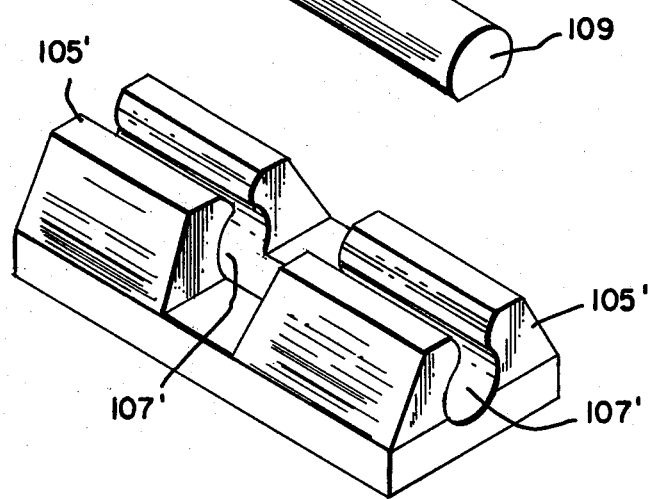
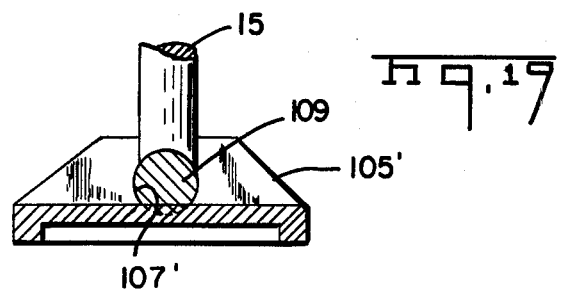
Fig. 19

RACING GAME

BACKGROUND OF THE INVENTION

1. Field of the Invention

This invention relates to a vehicle racing game.

2. Description of the Prior Art

Simulated racing games have been popular and well known in the toy art. However, prior art simulated racing games have always been required to sacrifice realism in the interest of economics and vice versa. It is therefore a continuing desire in the game art to provide racing games with improved realism without economic sacrifice.

SUMMARY OF THE INVENTION

The above is accomplished in accordance with the present invention wherein there is provided a racing game having the realism of live motorcycle or other races and which is also economically cost effective relative to prior art games of this type.

Briefly, the invention comprises a racing game having movable terrain and a controlled vehicle having freedom in the vertical and horizontal planes. The terrain speeds are controllable by the operator and automatically reduced in response to predetermined improper operation. Obstacles are positioned on the terrain, in the form of a belt, which are self-righting according to one embodiment, and require operator righting in accordance with another embodiment. Other obstacles, such as ramps, trees, etc. are permanently positioned. Motor speed is controlled by rotation of a hand grip on the handlebar which rotates a shaft in one embodiment. The belt is driven by a pair of rollers, one being biased to remove belt slack, the rollers having sets of aligned valleys or indentations for accommodating objects secured to the underside of the belt.

The vehicles are rotatable relative to the steering mechanism and touch the belt in a manner to permit them to face along the line which is the vector sum of the speed and direction of belt travel as well as speed and direction of horizontal movement of the vehicle.

Provision is made to provide sounds which simulate the actual vehicle sounds during a race.

BRIEF DESCRIPTION OF THE DRAWINGS

FIG. 1 is a pictorial three dimensional view of a first embodiment of a racing game in accordance with the present invention;

FIG. 2 is a view taken along the line 2—2 of FIG. 1;

FIG. 3 is a bottom view of the embodiment of FIG. 1;

FIG. 4 is an enlarged view of the ON-OFF switch in accordance with the present invention;

FIG. 5 is an enlarged view of the handlebars and battery compartment of the embodiment of FIG. 1;

FIG. 11 is a pictorial three dimensional view of a second embodiment of a racing game in accordance with the present invention;

FIG. 12 is a side view of a steering system in accordance with a second embodiment of the invention;

FIG. 13 is a pictorial three dimensional view of the embodiment of FIG. 12;

FIG. 14 is an enlarged cross-sectional axial view of the aircraft of FIG. 11;

FIG. 15 is a cross-sectional view normal to the view of FIG. 14;

FIG. 16 is an exploded view of a first embodiment of an obstacle;

FIG. 17 is a diagrammatic view of the installation of the embodiment of FIG. 16;

FIG. 18 is an exploded view of a second embodiment of an obstacle and mount;

FIG. 19 is a transverse sectional view of the obstacle mount of FIG. 18.

DESCRIPTION OF THE PREFERRED EMBODIMENTS

Figure 6:
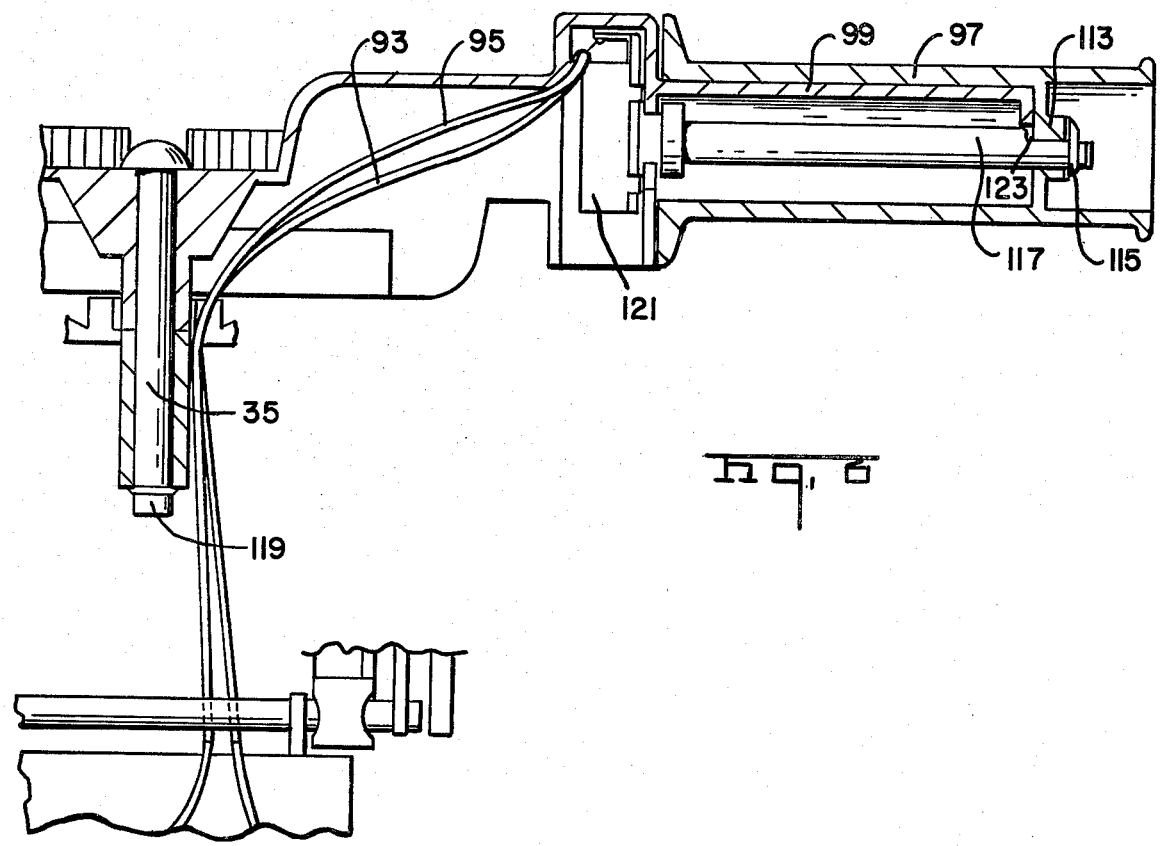
FIG. 6 is an enlarged view of the speed control handlebar portion and horizontal handlebar pivot of the embodiment of FIG. 1.

Referring now to FIG. 1, there is shown a pictorial three dimensional view of the invention. The invention includes a base 1 which is formed from plastic or other material and simulates a motorcycle with handlebars 3 and a movable belt 5 disposed in the base. A motorcycle 7 is secured to and suspended from a wire 9 which is also secured to the motorcycle handle mechanism 3 as will be explained in more detail hereinbelow. Operation of the motorcycle handle mechanism 3 in the manner to be described hereinbelow will move the belt 5 at predetermined speeds and also control the position of the motorcycle 7 in both a horizontal and vertical plane. The speed of the moving belt is controlled by the right hand handgrip 11 of the handle mechanism 3. A key 13, which simulates an ignition key, turns the system on and off as will be explained hereinbelow. The key will operate a switch which will provide power to permit movement of the belt 5 and rotation of the handgrip 11 will operate a rheostat to control the speed of movement of the belt 5. Three dimensional obstacles 15 stand on the belt and are held thereon in different ways as will be explained hereinbelow. A timer mechanism 91 is also provided for timing a racing cycle. The timer is secured in the base 1 and is of standard construction such as the standard spring wound clock or kitchen timer. An index point 92 is affixed to the base 1 to provide easy reading of elapsed time from the marks on the rotatable member 94 of the timer. A simulated gasoline tank cover 59 is also shown.

Referring now to FIG. 2, there is shown a cross-section through the base 1 of FIG. 1. The base 1 includes an open area at the rear denoted as 18 to permit obstacles 15 to rotate unobstructed along with the belt 5 into the interior of the base 1 and around along the path of the belt 5. The belt 5 is wound about a pair of rollers 17 and 27, the roller 17 being secured in a groove in levers 19 via its axle 25 and the roller 27 being journalled in the base 1 by its axle 29. The levers 19 are secured to the base as will be explained in detail hereinbelow. The axle 25 is biased by means of levers 19 which are spring-biased by springs 31 secured to the levers 19 and the base 1 to maintain the belt 5 in taut position to take up for errors in manufacturing or other problems which would cause slack to otherwise form in the belt 5.

The obstacle 15 is shown with a magnet 21 secured thereto and a magnet 23 secured to the underside of the belt 5. This is one manner for securing obstacles to the belt 5, the advantage of this double magnet (21, 23) being that, when an obstacle 15 is knocked over due to collision with the motorcycle 7, it will right itself by the force of gravity when the obstacle 15 has rotated sufficiently so that it is at the belt underside and pulled downward by the force of gravity. This will provide a self-righting action to the obstacle 15 but the obstacle with attached magnet 21 will continue to be attracted to the magnet 23 and retain its location on the belt.

Also shown as part of the base 1 is the handlebar 3 which includes a top handlebar portion 33, secured to and rotatable about a pivot pin 35 which is secured in a lower handlebar portion 37. The handlebar portion 33 is rotatable in a horizontal plane about the pivot pin 35 and, via the wire 9, which is secured thereto and to the motorcycle 7, can provide horizontal movement to the motorcycle 7 by rotation of the handlebars 3 in the horizontal plane. A stop (not shown) can be provided to prevent movement of motorcycle 7 in the horizontal plane beyond the side extremities of the belt 5.

The handlebar portion 37, into which is secured the pivot 35, is rotatable about a pivot 39 which is secured in base 1 and which is in the horizontal plane to provide an upward and downward movement to the motorcycle 7 via the wire 9 as shown in phantom. This is accomplished by pulling back on the handlebars 3 to permit the rotary motion about the pivot 39. The handlebars are normally biased by the spring 41 which is connected between a flange portion 43 of the handlebar portion 37 and a post 43 secured to a battery box 45 which is integral with the base member 1. This biasing action will maintain the motorcycle 7 normally on the belt 5 when no upward force is being exerted with only the rear motorcycle wheel touching the belt. The top of the battery compartment 45 will act as a stop against downward movement of motorcycle 7 beyond belt 5 by contact with flange 43. The wire 9 is secured in a bushing 180 on the motorcycle 7 and is free turning therein relative to the motorcycle. In this manner, the motorcycle 7 will rotate around the wire with only the rear wheel touching the belt 5 to be pointed along the line of the vector sum of belt movement and lateral vehicle movement to provide realism.

Also shown in FIG. 2 is the on-off switch 182 which is operated by the key 13. The switch, shown in detail in FIG. 4, includes a cylinder 47 having cam lobes 49 and 51 and a key slot 48 for receiving the key 13. Rotation of the key will rotate the cylinder so that the cam lobes 49 will move against an electrically conducting spring member 53 and urge same downward so that it will then make contact with a pair of terminals 55 and 57 to complete a circuit as will be explained in more detail hereinbelow. Batteries (not shown) will be placed in the battery box 45 as will be disclosed in more detail hereinbelow. One of the battery contacts 56 is shown. Also shown is the timer 91 described hereinabove.

Referring now to FIG. 3 there is shown a bottom view of the invention herein. The battery box is covered in part with a strap 61 which can be of thin flexible metal or plastic and which has indented end portions 73 which fit into slit type apertures in the battery case 45 to hold the batteries (not shown) within the battery case. Also generally shown is the key 13 and starting system shown in FIG. 4 as well as four terminals 65, 67, 69 and 71 which provide electrical current to the remainder of the circuit from the battery in a manner which will be described in detail hereinbelow.

Referring now to the roller mechanism for rotating the belt 5, it can be seen that the roller 17 includes a plurality of spaced raised portion 64 and that the roller 27 includes a plurality of spaced raised portions 63. The purpose of these alternately spaced raised portions is to permit magnets such as the magnet 23 of FIG. 2 to rotate over the rollers 17 and 27 without any impediment being provided thereto. It is therefore apparent that magnets 23 are designed to be of smaller length than the space between raised portions 63 and 64 and to be aligned with the valley portions between the raised portions 63 and 64 to provide unimpeded passage.

Figure 10:
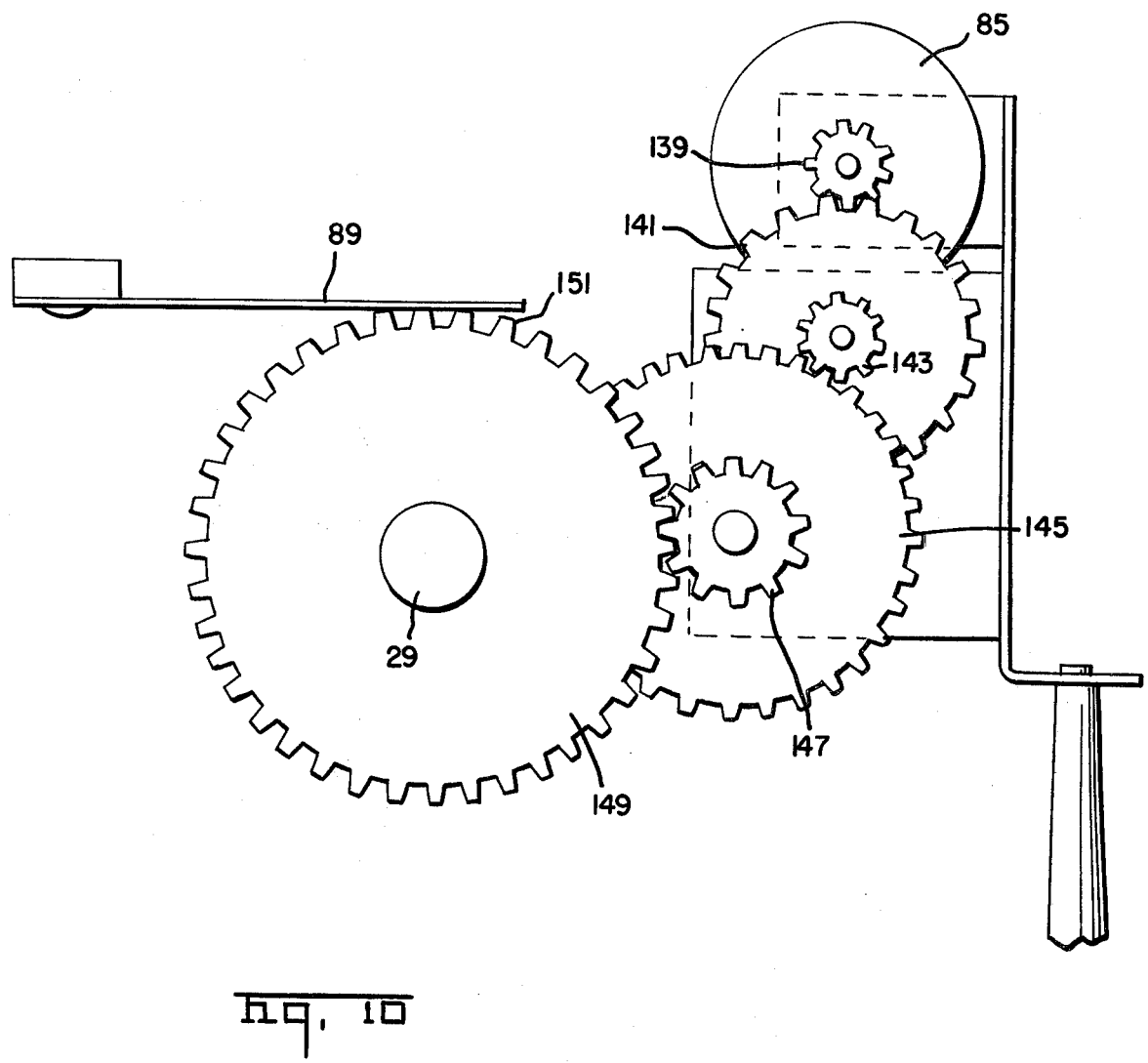
FIG. 10 is an enlarged view of the drive system for the roller 27 and the sound producing system in accordance with the present invention.

As can be seen in FIG. 3, the levers 19 as shown in FIG. 2 are journalled for rotation in and about brackets 75 and 77 at pivots 80 (FIG. 2), the brackets being secured to the housing 1 by means of rivets 79 or the like and pivots 80 secured in the brackets. The biasing springs 31 are shown, the operation of which have been discussed hereinbelow. The shaft 25 is positioned in the grooves in levers 19. Similarly, the roller 27 is secured in brackets 81 and 83 via its shaft 29, the brackets being secured to the housing 1 by means of rivets 79 or the like. The roller 27 is driven by means of a motor 85 and associated gearing (FIG. 10). The motor is mounted in a bracket 87 which is mounted in the base 1 by means of rivets 88 or the like. The driving system for the roller 27 will be described in more detail hereinbelow. Also shown is a reed member 89 which can be made of metal, phenolic resin or the like which is mounted in the base 1 by means of a rivet 90 or the like. The free end of the reed 89 rides over a serrated wheel 151, (to be described in detail hereinbelow) to provide the normal motorcycle sounds. It can be seen that the frequency of the sound will increase and decrease with speed of rotation of the belt 5.

Referring now to FIG. 5 there is shown in greater detail a portion of the handlebar mechanism 3. Again it can be seen that the battery compartment 45 is provided along with the key 13 with cylinder 47 and cam lobes 49 and 51 which drive the spring member 53. One of the hand grips 11 includes an outer rotating portion 97 and an inner stationary portion 99. The inner portion 99 is a part of the handlebar 3. A rheostat or potentiometer 121 of standard type is secured in the portion 99, as better shown in FIG. 6, the rheostat having a standard shaft 117 with an indented flat portion 123 at its end. The rotating portion 97 includes a depending annular flange 113 which surrounds the shaft 117 at the flat portion 123 and is locked thereon by a push nut 113. By rotating the rotary portion 97, the flange 113 will cause the shaft 117 to rotate and thereby vary the resistance of rheostat 121. The wires 93 and 95 leading from the potentiometer will control the speed of the motor 85 and thereby the speed of the belt 5.

Referring again to FIG. 6, there is shown in greater detail the hinge pin 35, the head of which is secured to the handlebar 3 and the other end of which is secured to the handlebar 3 by means of a push nut 119.

Figure 7:
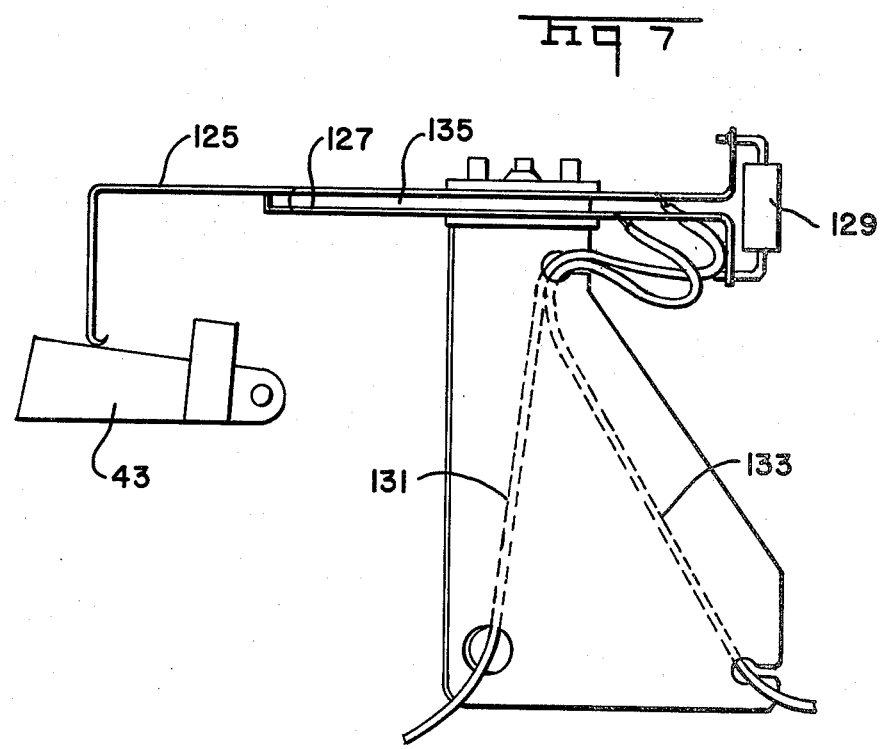
FIG. 7 is a view of the motor slow down switch of the embodiment of FIG. 1.

Referring now to FIG. 7, there is shown an additional circuit which shows the flange portion 43 of the handlebar as shown best in FIG. 2 abutting a portion of an electrically conductive leaf spring 125, which is in contact with an electrically conductive leaf spring 127 to provide a short circuit therebetween. The leaf springs are also connected together by means of a resistor 129. Wires 131 and 133 travel from the two leaf spring members. The purpose of this circuit is to prevent a player from lifting the motorcycle 7 above all obstacles and automatically winning a game by not hitting any of the obstacles. For this reason, when the motorcycle is lifted high enough by pulling back on the handlebars 3 about the pivot 39, the flange 43 will move upward as shown in FIG. 2 and, as shown in FIG. 7, move against the spring 125 and move same out of contact with the spring 127. This will automatically remove the short circuit across the resistor 129 and place this resistor into the circuit. As will be shown in more detail hereinbelow, this will cause the motor 85 to slow down and therefore slow down the movement of the belt 5. As can be seen in FIG. 7, the springs 125 and 127 are separated by insulation 135.

Figure 8:
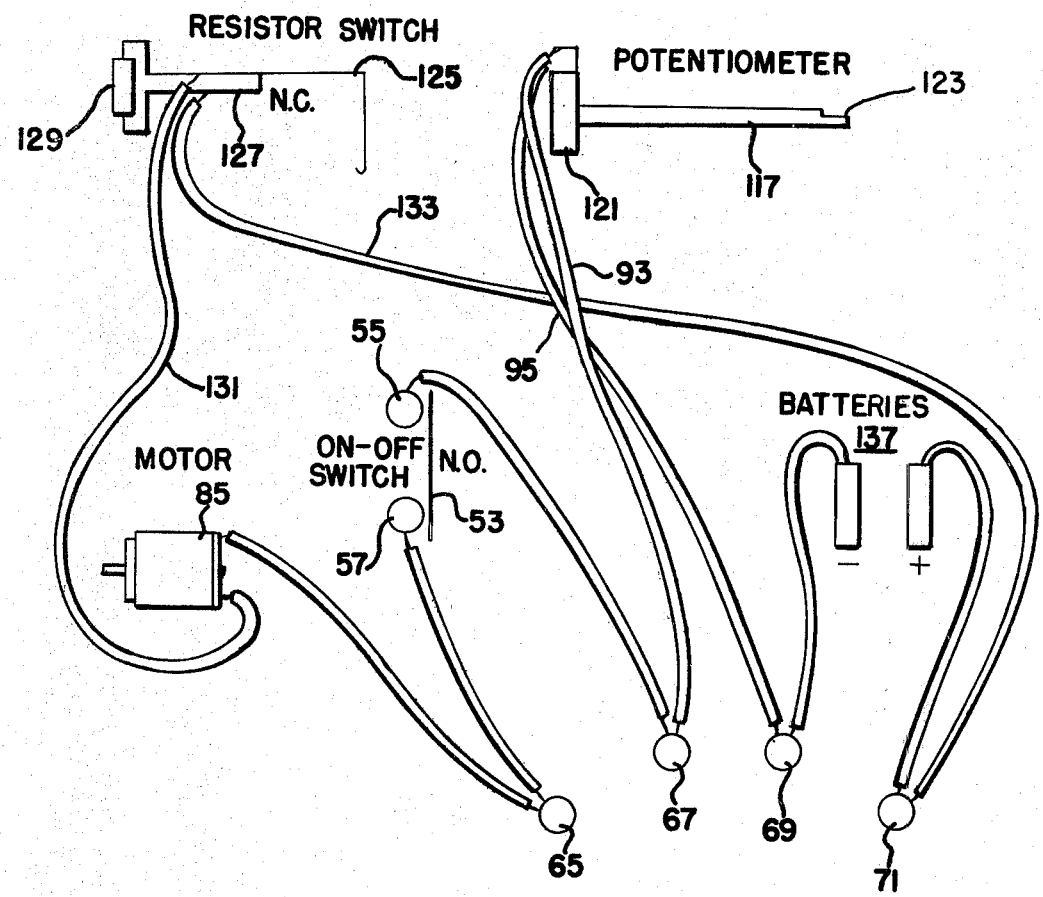
FIG. 8 is a wiring diagram of the electrical circuit of the present invention.
Figure 9:
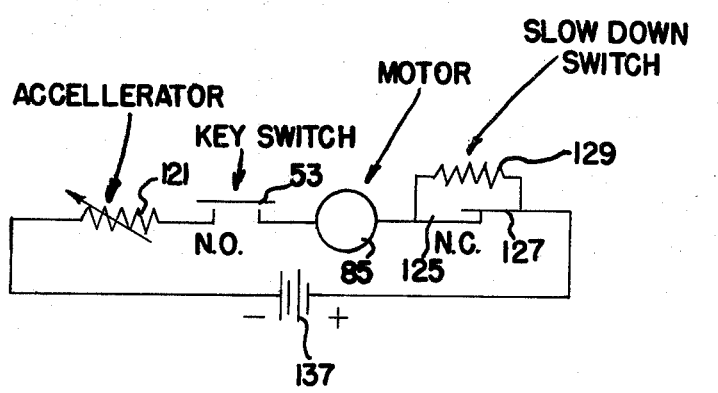
FIG. 9 is a circuit diagram of the circuit of FIG. 8.

Referring now to FIGS. 8 and 9 there are shown a wiring diagram and a schematic diagram of the electrical circuit of the present invention. There are shown the batteries 137 which are placed in the battery compartment 45 and which are connected via the slow down resistor switch including resistor 129 and spring members 125 and 127 to the motor 85 and then through the on-off key switch (53, 55, 57) to the accelerator which is the potentiometer 121 in the handlebar and then back to the battery 137 again. As can be seen the wiring and schematic circuitry are relatively simple and straight forward.

The circuit is turned on by rotating key 13 to close the on-off switch and thereby supply normal current to motor 85 via the slow down switch (normally short circuited) and the accelerator (potentiometer 121). The motor 85 drives the roller 27 as discussed hereinabove. The motor speed is controlled by rotation of the handlebar 11 to vary the resistance of potentiometer 121. The motor speed is reduced immediately by pulling back sufficiently on the handlebars 3 to open the slow down switch and place resistor 129 into the motor circuit.

Referring now to FIG. 10 there is shown a more detailed view of the drive circuit for driving the roller 27 by means of the motor 85. As shown, the motor 85 includes a pinion 139 which drives a gear 141 having a pinion 143 which in turn drives a gear 145 having a pinion 147. The pinion 147 drives a gear 149 on the shaft 29 to drive the roller 27. Also mounted on the shaft 27 is a further wheel 151 having a predetermined number of teeth to provide a desired sound frequency. The teeth are preferably sharp edged. The reed 89 is mounted so as to fall on the teeth of the wheel 151 and provide a sound frequency of the desired type to simulate a motorcycle. If desired, the gears 141 and 145 can be omitted and the motor shaft can have a gear which directly drives the gear 149.

Referring now to FIG. 11, there is shown a pictorial view of a second embodiment of a steering wheel for steering an airplane. Here there is shown a steering wheel 161 which controls an airplane 163 via a wire 165. The belt movement is determined by operation of a lever 167 which operates the rheostat 121 and performs the same functions as the rheostat in the handlebar 11 of the prior embodiment. Otherwise, everything on the belt 5 operates in the same manner as described hereinabove with respect to the prior embodiment.

The steering herein differs from that of the prior embodiment as best shon in FIGS. 12 and 13. As can be seen, the aircraft 163 can operate in a vertical plane by movement of the steering wheel 161 about the pivot 167 which is secured in the base 1 whereby the aircraft will move up and down. For horizontal action, the steering wheel 161 is rotated in a rotary direction as shown by the arrows 169 in FIG. 13. Movement of the steering wheel 161 in a rotary direction will cause the shaft 171 to rotate and thereby cause the arm 173, attached thereto, to move leftward or rightward in the direction of the arrow 175. The arm 173 includes an aperture 177 through which passes a finger member 179. The finger member is attached to a shaft 181 which, in turn, is connected to the wire 165. It can be seen that when the arm 173 moves in the direction of arrow 175, the finger 179 will be moved along therewith since it is positioned through the aperture 177 and causes the shaft 181 to rotate in the direction of the arrow 183. Since this is a rotary action, this will cause the wire 165 to move in a horizontal plane, thereby providing to the airplane 163 two degrees of freedom, one in the horizontal plane from rotation of the handlebar 161 and one in the vertical plane by pulling back or pushing forward on the handlebar 161.

Referring now to FIGS. 14 and 15, there is shown an enlarged view of the aircraft 163. As can be seen, the wire 165 passes through the airplane 163 and bends back therein into a rectangular groove 185 having a V-shaped top 187. As can be seen, due to the V-shape of the top of the groove, the wire portion 189 which fits into the groove 185 will move into the groove V-shaped portion 187 when the aircraft 163 is in flight. This will cause the airplane to always line up properly with the belt 5. Alternatively, when the airplane is on the ground, the wire portion 189 will move below the V-shaped groove 189 and thereby allow the airplane to turn or rotate freely on the ground. This free movement on the ground permits the airplane to turn in the direction of movement when it is on the ground and being moved in a sideways direction. In other words, the vehicle, when on the ground, in accordance with the embodiment as shown in FIGS. 14 and 15, is permitted to take a position along a line which is the vector sum of the movement of the vehicle caused by operation of the steering wheel and the movement of the belt. In order to provide for this motion, only the rear portion of the pontoons 191 will touch the ground when the airplane is on the ground. This will provide the desired movement. Similarly, in the case of the motorcycle in the embodiment discussed hereinabove, the wire will be positioned in a rotary bushing and again, only the rear wheel of the motorcycle will touch the belt 5 in order to provide the desired direction for the motorcycle as discussed hereinabove. The flange portion of the wire 189 will always be within the cavity 185 and free to rotate completely therein when positioned beneath the V as shown in FIGS. 14 and 15. The flange portion 189 will never go below the bottom of the plane due to a stop mechanism 193 which will be provided at the handlebar in order to prevent the flange 189 from scraping against the path. It can be seen that there has been provided a game which is relatively simple and provides realistic driving conditions.

Referring now to FIGS. 16 and 17, there is shown a second embodiment of an obstacle. The obstacle includes a base portion 101 which is secured to the belt 5 and includes a spring tongue member 103 and a pair of end members 105 with slots 107 therein. The obstacle itself has a pair of hinged pin portions 109 which fit into the slots 107. As can be seen from FIG. 16, when the base 101 is flexed in arcuate shape, the portions 105 are moved apart and provide sufficient space therebetween to enable the hinge pins 109 to be inserted into the aperture or slots 107. The base is then released to its flat position and the obstacle 15 with the hinge pins locked into the slots 107 is in condition for operation. The spring 103 will move against the flat portion 111 on the obstacle 15 to maintain the obstacle in the upright position. However, when the obstacle is knocked over, the spring 103 will move against the flange portion 113 and stay in that position until the obstacle is physically made upright again. There is no automatic resetting in this embodiment.

The base 101 may be fastened to the belt 5 with standard snap fasteners by eyelets, by cement, or by other well known means. Rigid obstacles which cannot be knocked over, may be fastened directly to the belt by any of the above means.

The motorcycle toy is operated by setting the timer 91 and then turning on motor 85 by turning the key 13 to the "ON" position. The belt 5 will now move in a direction toward the operator at the handlebars 3, the speed of belt travel being controlled by the operator via the potentiometer in handlebar portion 11. The belt speed is controlled to allow easy manueverability around or over obstacles 15. Penalties are provided for striking obstacles as well as for the length of time required to traverse the course. In the event the operator attempts to circumvent all obstacles by lifting the motorcycle above all obstacles, the slow down switch will open and slow down the belt, thereby providing a penalty.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A racing game comprising, in combination,
   (a) a flexible endless belt,
   (b) roller means positioned within and driving said belt and substantially coextensive in width therewith,
   (c) a housing supporting said roller means,
   (d) control means for variably controlling rotational speed of said roller means,
   (e) a simulated vehicle supported on said belt,
   means for maintaining the vehicle at a fixed location on said belt comprising means extending from a location exteriorly of the housing to said vehicle, said means for maintaining and said vehicle having cooperative means for restraining lateral movement of the vehicle relative to the belt but permitting rotatable movements of the vehicle about an axis normal to the belt and relative to said means for maintaining,
   and means secured to the housing for operating said means for maintaining to raise said vehicle from said belt and to move it laterally to a different location on the belt, whereby the vehicle will orient itself in a direction longitudinally of the belt by pivoting about said normal axis when it is lowered to contact the moving belt at said different location to simulate a steering movement.

2. A racing game as set forth in 1 wherein said roller means includes a plurality of discrete rollers further includes a toothed gear secured for rotation with one of said rollers and means riding on the teeth of said gear to provide a sound simulating vehicle operation.

3. A racing game as set forth in claim 1 wherein said roller means includes a plurality of discrete rollers, further including motive means controlled by said control means for driving one of said rollers and biased lever means supporting the other of said rollers for urging the other of said rollers away from said one of said rollers to maintain said belt taut.

4. A racing game as set forth in claim 1 wherein said means secured to said housing includes handlebar means and said control means is positioned on said handlebar means.

5. A racing game as set forth in claim 1 wherein said control means includes a variable resistor and a rotatable handlebar portion for controlling said variable resistor.

6. A racing game as set forth in claim 5 wherein said handlebar portion is rotatable relative to said handlebar means, said variable resistor including a resistance controlling shaft coupled for rotation with said handlebar portion.

7. A racing game comprising, in combination,
   (a) a flexible endless belt,
   (b) roller means positioned within and driving said belt and substantially coextensive therewith,
   (c) a housing supporting said roller means,
   (d) control means for variably controlling rotational space of said roller means,
   (e) a vehicle, and
   (f) means secured to said housing and said vehicle for directing said vehicle relative to said belt in two degrees of freedom, wherein said roller means includes a pair of spaced rollers, said rollers each including aligned grooves therein and further including an obstacle retaining means secured to the underside of said belt and aligned with said grooves, whereby said obstacle retaining means passes in said grooves when passing over said rollers.

8. A racing game as set forth in claim 7 wherein said roller means further includes a toothed gear secured for rotation with one of said rollers and means riding on the teeth of said gear to provide a sound simulating vehicle operation.

9. A racing game as set forth in claim 8 further including motive means controlled by said control means for driving one of said rollers and biased lever means supporting the other of said rollers for urging the other of said rollers away from said one of said rollers to maintain said belt taut.

10. A racing game as set forth in claim 7 further including motive means controlled by said control means for driving one of said rollers and biased lever means supporting the other of said rollers for urging the other of said rollers away from said one of said rollers to maintain said belt taut.

11. A racing game as set forth in claim 7 wherein said obstacle retaining means includes a first magnet, said game further including obstacle means including a second magnet positioned on the top of said belt and aligned with said first magnet.

12. A racing game as set forth in claim 7 wherein said obstacle retaining means includes a snap means, said game further including obstacle means including mating snap means removably secured to said snap means.

13. A racing game as set forth in claim 7 wherein said obstacle retaining means includes a base having spaced hinge pin receiving means and spring means intermediate said spaced hinge pin receiving means, said game further including obstacle means having a flange supported by said spring means, said obstacle having hinge pins positioned in said hinge pin receiving means and rotatable therein, said base including means to receive said flange upon rotation of said obstacle.

14. A racing game comprising, in combination,
(a) a flexible endless belt,
(b) roller means positioned within and driving said belt and substantially coextensive therewith,
(c) a housing supporting said roller means,
(d) control means for variably controlling rotational speed of said roller means,
(e) a vehicle, and
(f) means secured to said housing and said vehicle for directing said vehicle relative to said belt in two degrees of freedom wherein said means secured to said housing and vehicle includes handlebar means having a first horizontally rotatable portion and a second portion rotatable about an axis in the horizontal plane secured to said horizontally rotatable portion, said second portion being normally biased in a predetermined position and a wire securing said first portion to said vehicle.

15. A racing game as set forth in claim 14 wherein said vehicle includes means retaining said wire, said wire being rotatable in said means retaining, said vehicle being positioned to be supported on said belt only at its rearward end.

16. A racing game as set forth in claim 14 wherein said wire includes an end portion spaced from and substantially parallel to a principal portion of said wire and said vehicle includes retaining means for retaining said end portion of said wire, said retaining means comprising a groove of sufficient cross-sectional dimension to permit rotation of said end portion therein, said groove including an upper V-shaped portion for receiving end portion, said end portion being vertically movable in said groove, said vehicle being positioned to be supported on said belt only at its rearward end.

17. A racing game as set forth in claim 14 further including means responsive to a predetermined rotation of said handlebar means in a direction normal to said horizontal plane to alter the rotational speed of said roller means.

18. A racing game as set forth in claim 17 wherein said means responsive to a predetermined rotation includes a resistor and a pair of electrical conductors connected to said resistor and normally short circuiting said resistor, said conductors being separable responsive to said predetermined rotation to place said resistor in the circuit of said control means.

19. A racing game comprising, in combination,
(a) flexible endless belt,
(b) roller means positioned within and driving said belt and substantially coextensive therewith,
(c) a housing supporting said roller means,
(d) control means for variably controlling rotational speed of said roller means,
(e) a vehicle, and
(f) means secured to said housing and said vehicle for directing said vehicle relative to said belt in two degrees of freedom wherein said means secured to said housing and vehicle includes handlebar means which includes a handlebar, a first shaft secured to and rotated by said handlebar, a flange secured to said first shaft and positioned in a plane substantially normal to said first shaft, said flange having an aperturn therein, a second shaft positioned substantially parallel to said flange and having a finger secured thereto and extending through said aperture, said first and second shaft each being rotatably secured in a steering member secured to said housing, a wire secured to said second shaft and said vehicle and means, said steering member being rotatable in said housing about a pivot in the horizontal plane and a wire connecting said vehicle to said second shaft, and stop means for limiting rotation of said steering member beyond predetermined positions.

20. A racing game as set forth in claim 19 wherein said vehicle includes means retaining said wire, said wire being rotatable in said means retaining, said vehicle being positioned to be supported on said belt only at its rearward end.

21. A racing game as set forth in claim 19 wherein said wire includes an end portion spaced from and substantially parallel to a principal portion of said wire and said vehicle includes retaining means for retaining said end portion of said wire, said retaining means comprising a groove of sufficient cross-sectional dimension to permit rotation of said end portion therein, said groove including an upper V-shaped portion for receiving said end portion, said end portion being vertically movable in said groove, said vehicle being positioned to be supported on said belt only at its rearward end.

22. A racing game as set forth in claim 19 further including means responsive to a predetermined rotation of said handlebar means in a direction normal to said horizontal plane to alter the rotational speed of said roller means.

23. A racing game as set forth in claim 22 wherein said means responsive to a predetermined rotation includes a resistor and a pair of electrical conductors connected to said resistor and normally short circuiting said resistor, said conductors being separable responsive to said predetermined rotation to place said resistor in the circuit of said control means.

* * * * *